United States Patent [19]
Van den Berghe

[11] Patent Number: 5,660,098
[45] Date of Patent: Aug. 26, 1997

[54] APPARATUS AND METHOD FOR PUFFING CEREAL GRAINS

[76] Inventor: René Van den Berghe, Baneike 24, 9660 Brakel, Belgium

[21] Appl. No.: 624,889

[22] Filed: Mar. 27, 1996

[51] Int. Cl.⁶ .................................................... A23L 1/18
[52] U.S. Cl. .................................... 99/323.4; 99/568
[58] Field of Search ............................ 99/568, 323.4, 99/338; 426/482, 511

[56] References Cited

U.S. PATENT DOCUMENTS

| | | | |
|---|---|---|---|
| 2,279,868 | 4/1942 | Hayden | 99/323.4 |
| 4,569,850 | 2/1986 | Harris | 99/568 |

FOREIGN PATENT DOCUMENTS

| | | |
|---|---|---|
| 0 274 358 | 4/1987 | European Pat. Off. . |
| 729059 | 12/1931 | France . |

*Primary Examiner*—Timothy F. Simone
*Attorney, Agent, or Firm*—Shlesinger Arkwright & Garvey

[57] ABSTRACT

A puffing gun for preparing expanded cereal grains comprising a stationary gun barrel of tubular shape having a closed end face and an opposite end face provided with an openable sealing cover, the barrel being substantially horizontally mounted on a supporting frame. A rotatable drum is concentrically disposed within the interior of the stationary barrel and a drive device for rotating the drum is provided. The drive device is operatively connected to the drum and includes a drive shaft passing through the closed end face of the stationary barrel. Heating elements are disposed around the barrel for providing heat to the rotating drum. In addition, a grain feed device is provided for supplying a desired quantity of cereal grain to be expanded into the rotatable drum and a pressurized high gas inlet is provided for supplying pressurized gas to the interior of the barrel and the stationary drum. Operational control of the puffing gun is provided to selectively control heating and pressure of grain placed within the gun.

9 Claims, 6 Drawing Sheets

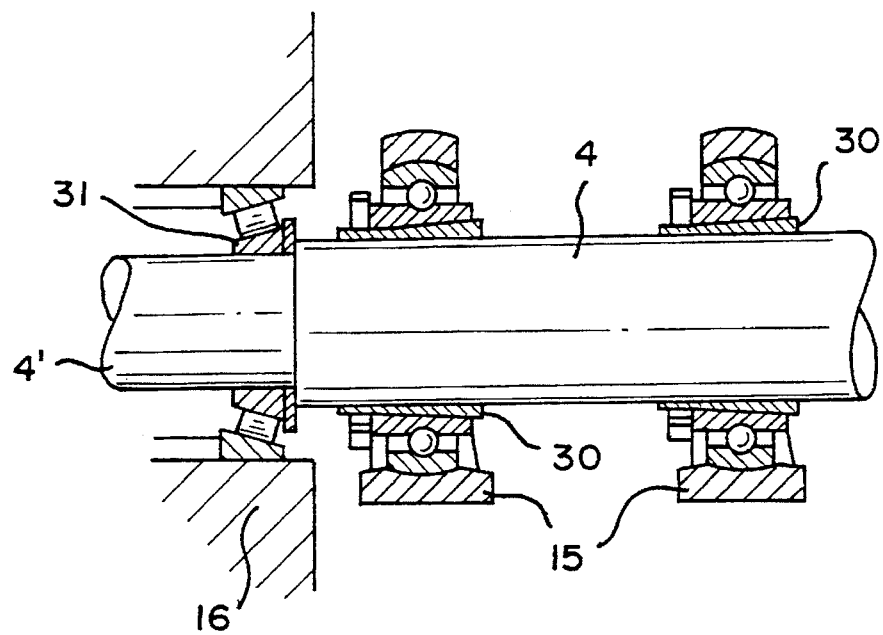
FIG. 5a
FIG. 5b
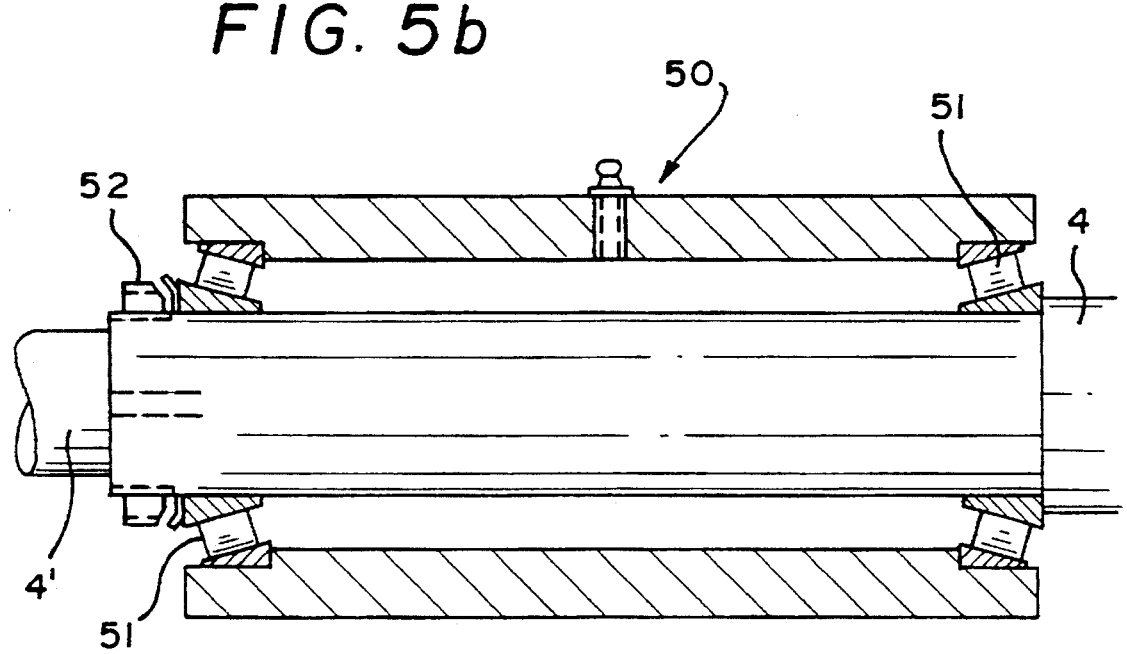

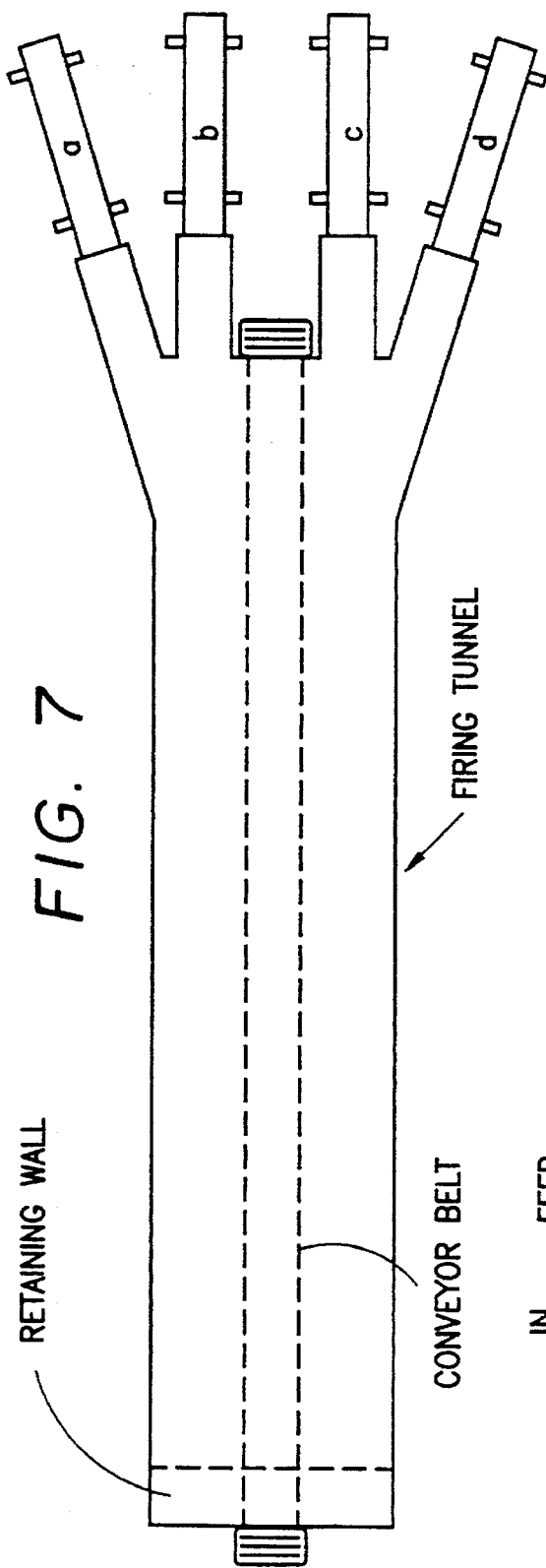
FIG. 7
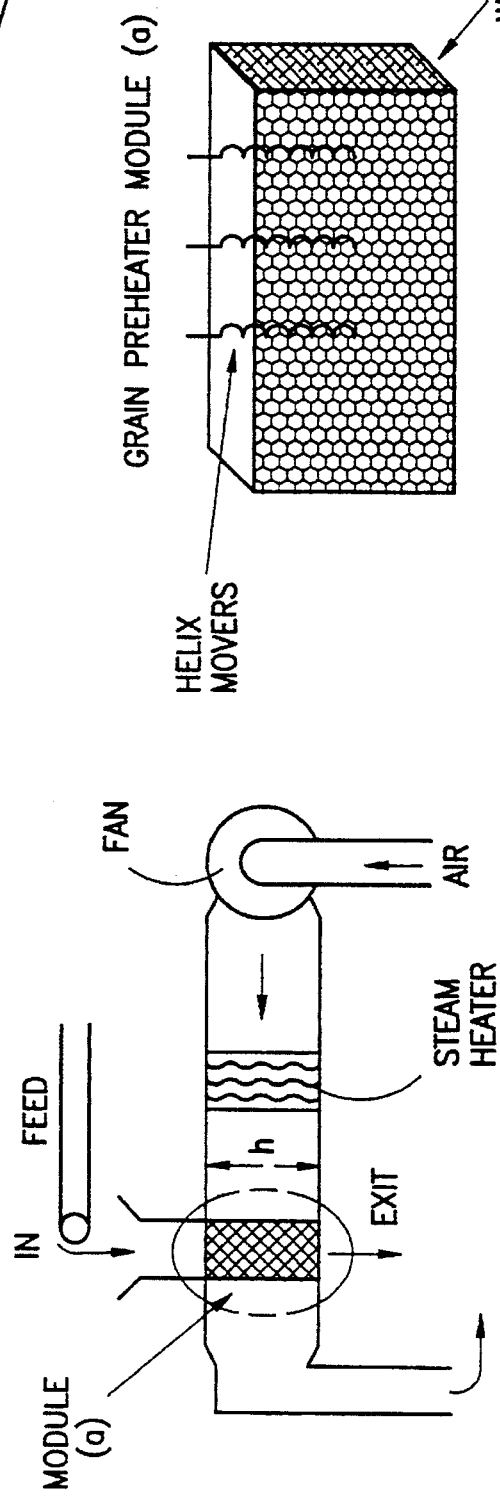
FIG. 8a
FIG. 8b 5,660,098

APPARATUS AND METHOD FOR PUFFING CEREAL GRAINS

FIELD OF THE INVENTION

The present invention relates to the production of puffed food products made from cereals such as wheat, rice, corn and the like in the shape of discrete, highly expanded grains, such as ready-to-eat cereals. In particular, the invention is related to an improved puffing apparatus of the type commonly known as a puffing gun, and to a method of manufacturing puffed cereal products by such apparatus.

BACKGROUND OF THE INVENTION

In the prior art, it has been a common practice to puff cereal grains by means of an explosion process in which a batch of grain is heated under gas (steam) pressure in a sealed tubular chamber of a puffing fun for a predetermined length of time. After a quantity of the grain has been sufficiently heated and the pressure and temperature within the gun chamber has reached a suitable level, the chamber is quickly opened to atmospheric pressure thus effecting a sudden expansion or "puffing" of the cereal grains which are then violently ejected from the chamber into a receiving bin or the like.

A common puffing gun consists of a sealable, long-sized rotating drum having strong construction for safety reasons, given the great stresses created on the gun by the explosive puffing action with each firing or shot. A typical puffing operation comprises the successive steps of loading, closing, heating, pressurizing and releasing for each batch to be processed. The execution of each of these steps in a convenient manner requires the addition of a number of auxiliary devices and mechanical equipment which renders the typical puffing gun a mechanically complex and heavy piece of equipment. For example, rotation of the drum, which is necessary for efficient and rapid heating of a loaded grain batch and to prevent burning of the grains, requires the addition of suitable rotating and support means for the drum. Heating requires the addition of proper heating means outside the drum, usually in the form of gas burners positioned underneath and circumferentially about the drum, or a heating furnace that encloses the rotatable drum. Given the rotation of the gun barrel, the pressure gas, usually steam, must enter at one side through a central longitudinal axis thereof and thereby necessitates a special inlet connection. The opposite side of the barrel must be closed by a sealing/hinged lid or cover, actuated by an appropriate mechanism. Because the firing position of the gun is essentially horizontal, efficient loading of a quantity of grains requires tilting of the drum and thus a pivotable supporting frame therefor. Such a gun construction is for example described in the Warren patent U.S. Pat. No. 2,116,212 and further improved J. J. von Edeskuty in U.S. Pat. No. 2,803,576. An improved closing mechanism is, for example, disclosed in EP 0,374,358.

The prior art devices are voluminous and expensive and require a lot of maintenance. Operational control and flexibility during use are rather poor. Furthermore, the prior art devices cannot be significantly increased in production capacity since enlarging the size of the gun and auxiliary mechanics leads to the huge, heavy constructions required to accommodate the increased violence of puffing explosions. The total process time per batch puffed with a conventional gun may amount to 7-10 minutes.

OBJECTS AND SUMMARY OF THE INVENTIONS

In the present invention, novel, radical changes have been made to the structure of a puffing gun which makes it possible and practical to use a gun having a much simpler construction with increased production capacity and in a considerable manner without the need to increase production capacity and in a considerable manner without the need to increase the size of the gun.

Accordingly, it is a prime object of the present invention to provide a novel puffing gun structure which overcomes the various mechanical problems encountered with conventional guns, and which is simple in construction and flexible in operation.

Another object of the present invention is to provide a puffing gun having increased production capacity and shorter production cycles.

A further object of the invention is to provide a puffing gun providing a uniform quality of puffed cereal grains and a greater yield of puffed product.

These objects are achieved by a novel puffing gun structure characterized by the technical features described below. Other objects and advantages will become apparent in the disclosure of the invention as found in following description and in the preferred embodiments as defined in the appending claims, taken in conjunction with the accompanying drawings.

BRIEF DESCRIPTION OF THE DRAWINGS

FIG. 5a is a sectional elevation of the bearing arrangement for the drive shaft of the interior drum.

FIG. 5b illustrates an alternative shaft bearing construction.

FIG. 7 is a schematic diagram illustrating a production line having multiple puffing guns positioned around a common firing tunnel.

FIG. 8 is a schematic view of a cereal grain preheater for use in cooperative with one or more puffing guns.

DETAILED DESCRIPTION OF THE PREFERRED EMBODIMENTS

A most essential aspect of the present invention is the provision of a stationary gun barrel having an interior rotatable drum. This allows direct fixation of preferably electrical heating elements, the heating shells that encapsulate the barrel, and the appropriate thermal insulation all of which are secured onto the gun circumferential surface. This results in an energy efficient, compact, gun structure having better control and uniform temperatures inside of the interior drum.

Since the present drum is of considerably lighter construction than the heavy prior art gun barrels, less power and a smaller drive are needed to rotate the grain mass loaded inside of the gun. Moreover, a supporting bearing structure for the gun may be saved.

In addition, the otherwise necessary axial positioning of the high pressure steam inlet including a rotation accommodating connection with the closed end face of a rotatable barrel as required by the prior art is no longer mandatory. Instead, a simple fixed steam or gas connection (one or more) will suffice and may be positioned at any convenient location on the stationary barrel.

According to a preferred embodiment of the invention, the novel puffing gun features a fixed connection to a grain feeding system located above the rear portion of the gun barrel. This portion is shaped as a grain receiving and conveying inner compartment confined between the closed end face of the puffing gun and the front face of the interior drum. To move the grain charge from the compartment and into the rotatable drum, the axial shaft portion thereof passing from a central bore in the barrel rear face and through this space up to its linkage with the front side of the actual puffing drum is advantageously shaped as a Archimedes type feeding screw. This embodiment eliminates the need for loading of the puffing gun through the thrown-open closure lid, resulting in an important savings in process time and also in capital expenditure by eliminating the need for a tilting system to bring the gun into an effective feeding position.

Figure 1:
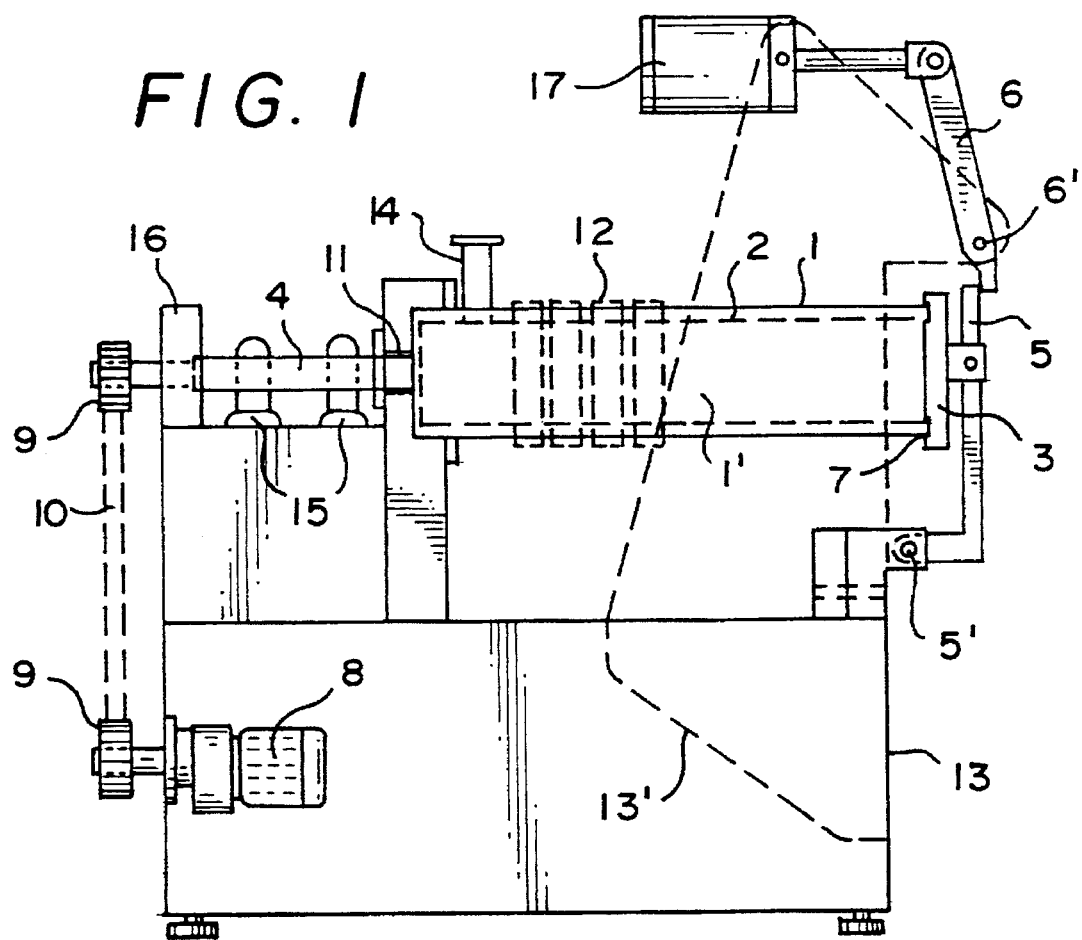
FIG. 1 is a sectional view of a first embodiment of this invention with certain details of the grain material supply not shown.
Figure 2:
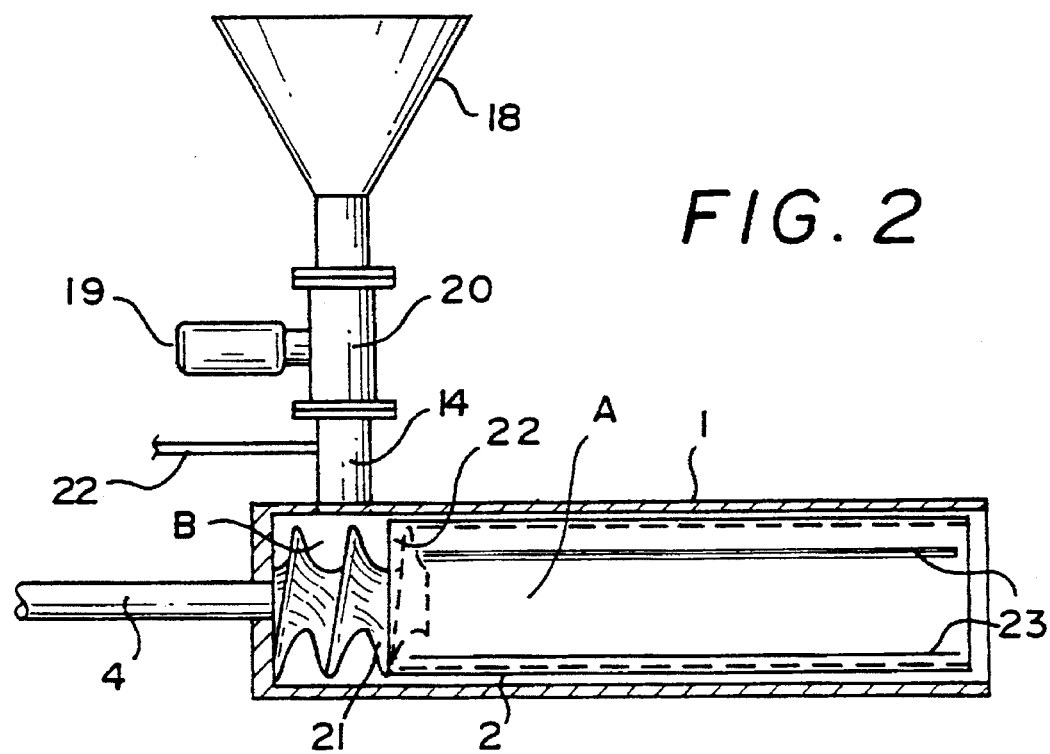
FIG. 2 is a sectional view of a puffing gun barrel with grain feeding means according to the present invention.

Referring now to FIGS. 1 and 2, there is shown a particular, non-limitative embodiment of the present invention. The puffing apparatus comprises a tubular gun barrel 1 enclosing a high-pressure chamber 1' wherein a long drum is rotatably mounted for receiving and revolving a charge of cereal grains to be heated and pressurized. The interior drum is connected to a drive shaft 4 rotatably mounted in proper bearings 15, 16 and driven by motor-reductor 8 with chain 10 and sprocket wheels 9. At joint 11 shaft 4 traverses the solid end face of gun barrel 1 which is openable at the opposite end face by actuation of closure lid or cover 3, hermetically pressed against the barrel edge by jack 17 and hinge arm 6. Gun barrel 1 is fixed in a generally horizontal position onto a supporting frame 13 that also caries drive 4,8 and an auxiliary means 13' for bearing the opening/closing mechanisms of cover 3. In the event of a gun charging through opened cover 3, a tilting system (not shown) may be provided to tilt the barrel for easier grain feeding. It will be understood that in such a case the rotatable drum extends over the whole length of the stationary barrel.

However, the greatest benefits are obtained with a puffing gun structure as depicted in FIGS. 1 and 2. Here, the feed grain inlet 14 is fixedly connected to the upper side of a closed rear portion of the gun barrel shaped as a grain receiving chamber B, from where the grain material is conveyed into the proper puffing chamber A within rotating drum 2. For facilitating grain transport from B to A, the part of drive shaft 4 passing through pre-chamber A is preferably built as a screw conveyor 21, whereby screw end face 22 forms a smooth fixed linkage with the front edge of drum 2. Adequate heating of puffing chamber A is achieved by means of electrical resistance elements 12 in the form of shells encapsulating barrel 1. One or more thermocouples (not shown), inserted in the barrel wall, control the heating power and distribution of elements 12 so as to achieve the desired steady temperature conditions inside drum 2. To enhance the turning and tumbling movement of the loaded grains, the inner wall of drum 2 may be provided with longitudinal ribs 23 of a suitable height. For minimizing heat losses, an extra insulation mantel may be wrapped around the radial heating shells.

Figure 4:
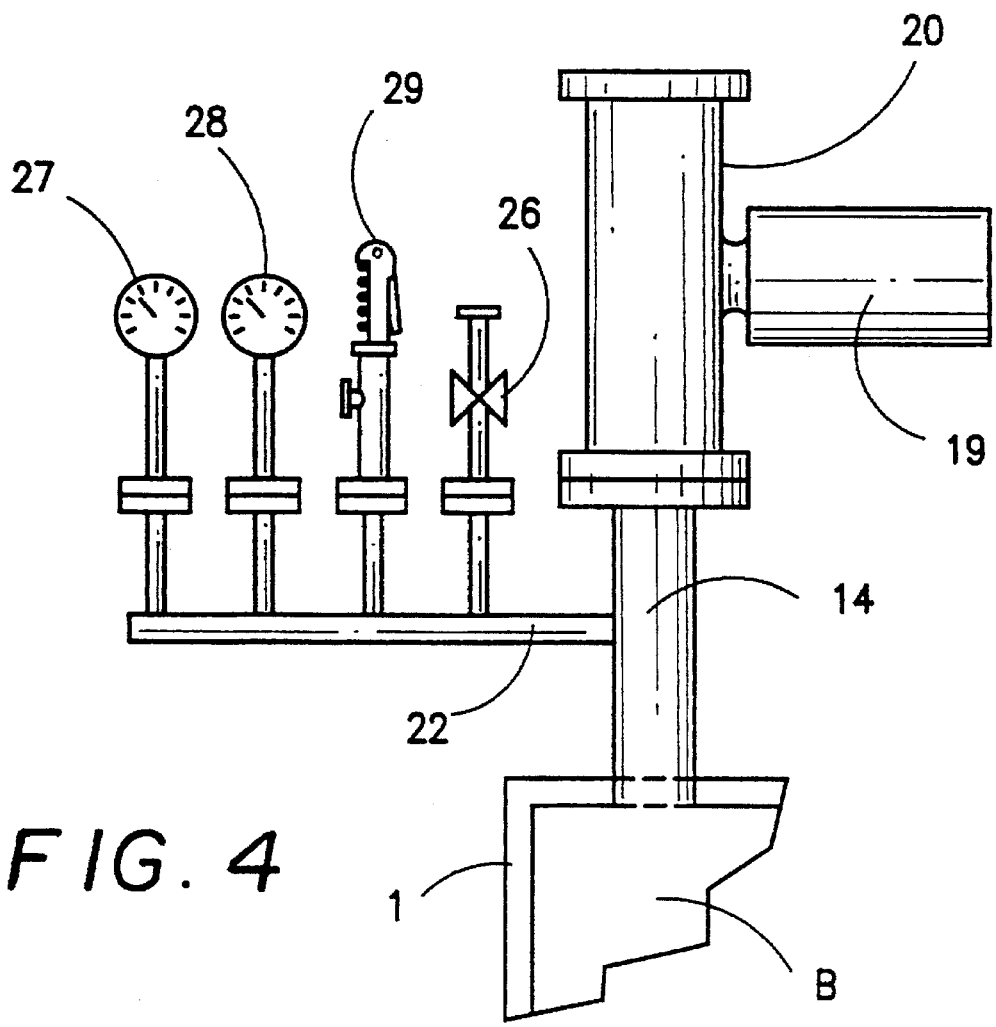
FIG. 4 illustrates a steam supply line connected to the lower portion of the grain feed pipe.

In the embodiment shown in FIGS. 2 and 4, the hot steam or gas pressure line is connected to the grain feed pipe 14 below grain dosimeter gate or lock 20, which forms an integral part of a valve body, e.g., a ball valve or star valve adapted to function as high-pressure seal between grain hopper 18 and puffing gun. The dosimeter valve has pneumatic or electric means 19 for automatic operation. Steam inlet line 22 comprises automatically actuatable valve means 26. Numerals 27, 28 and 29 refer to the usual control and security elements, manometer, pressiostat and overpressure safety member. In a modification of the embodiment shown in FIG. 2, the high-pressure steam inlet 22 may be directly connected to the gun barrel at one or more places. Also, a low pressure steam, respectively a hot air line, may be linked to the puffing gun as a separate circuit for preheating, steaming and/or pregelatinizing the cereal material inside the revolving drum prior to the supply of dry high-pressure steam for puffing. In these embodiments the rotating drum will advantageously comprise a plurality of small holes (smaller than the size of the cereal grains) to ensure a more intense fluid/grain contact.

Figure 3:
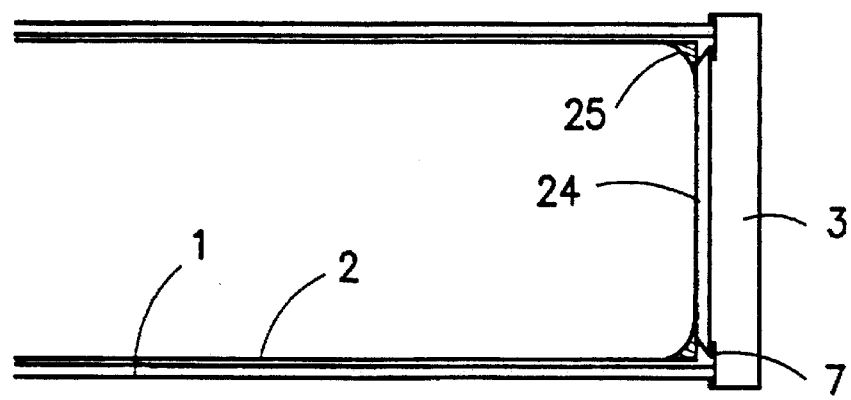
FIG. 3 illustrates a detail of the barrel end face adjacent the closure cover joining the interior drum.

FIG. 3 shows a detail of a useful jointing arrangement between closure lid 3, barrel 1 and drum 2. Reference numeral 7 designates a high-pressure seal while reference numeral 25 stands for a curved end edge of drum 2 which nearly rests against the back side 24 of lid 3 when hermetically closed. In this way, grains or broken pieces cannot enter the narrow clearance left between barrel 1 and rotating drum 2.

FIG. 5a and FIG. 5b illustrate two possible bearing configurations for the drive shaft to secure the latter against axial displacements and shocks relative to the stationary barrel due to the violent puffing explosions or shots.

In FIG. 5a the drive end portion of shaft 4 is supported by conical bearings 31 fixed to frame member 16. Bearings 15 are fastened with wig shaped clamping elements 30. FIG. 5b shows an anti-shock thrust bearing unit 50 with two oppositely clamped bearing pairs 51. The driven end part 4' of shaft 4 is secured thereto in fastening link 52.

Figure 6A:
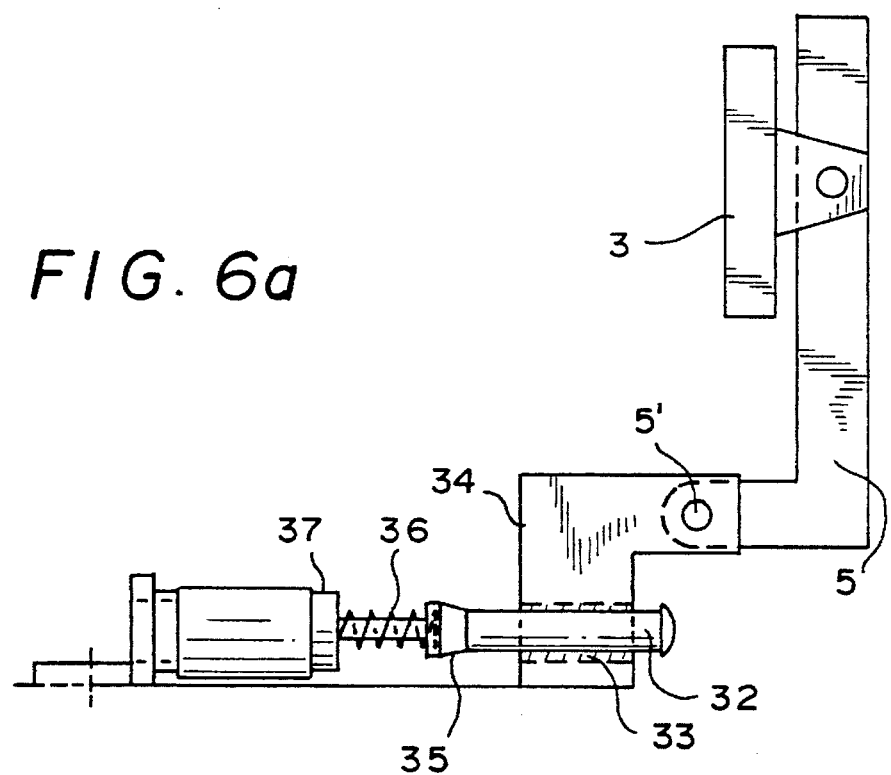
FIG. 6a illustrates a shock-absorbing mechanism for the releasable front cover in a closed position.
Figure 6B:
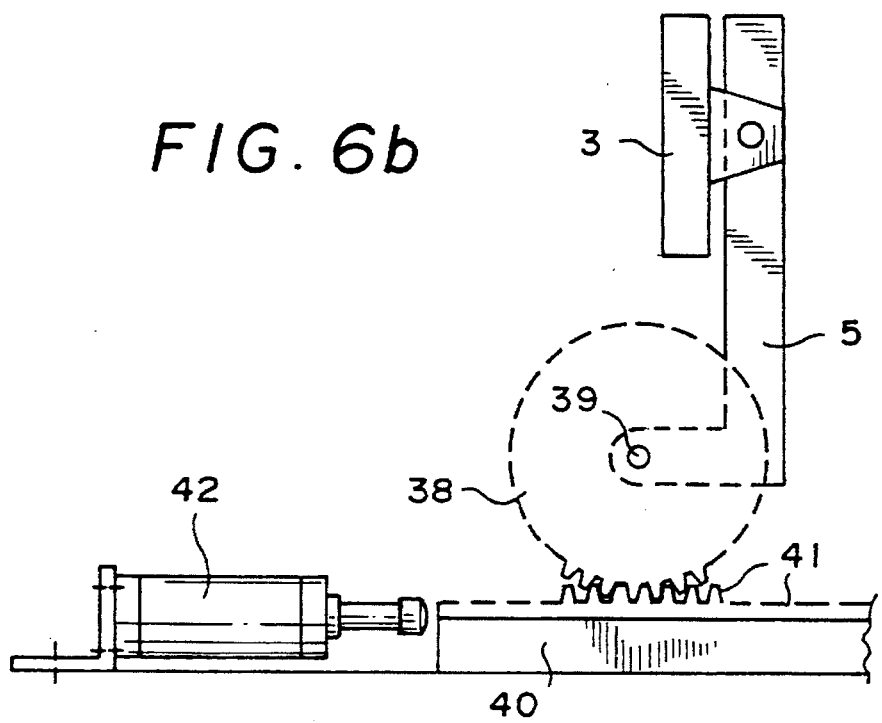
FIG. 6b illustrates a mechanism for pushing the thrown-open cover automatically back into its closure position following firing.

FIGS. 6a and 6b taken in conjunction with FIG. 1 show auxiliary mechanisms of the openable barrel cover 3. A clamping arm hinged at 6 at 6' to frame element 13' is actuated by a jack 17 to press the cover 3 tightly against the barrel end face and which is effected by the intermediate of hinged lower arm 5 to which cover 3 is fixed. Upon firing, jack 17 releases clamping arm 6, and cover 3 is instantaneously thrown open by the vigorous puffing explosion whereby the L-shaped cover supporting arm 5 violently turns downward against frame 13. To brake and damp the impact of arm 5 a shock absorbing mechanism is provided as depicted in FIG. 6a. It comprises a hydraulic damper 37, an impact bar 32 with rubber head sliding in a bore 33 of a frame member 34 that also supports hinged articulation 5' of arm 5, and spring element 36 which cooperates with oil damper 37 and a rear part 35 of impact bar 32. After shooting the opened cover, a heavy part hanging down with its arm 5, must be returned to a closure position. To effect this automatically, a mechanism is provided as shown in FIG. 6b. Arm 5 comprises a sprocket wheel 38, secured to its hinged rotation axis 39. Wheel 38 is geared to a toothed rack 41 sliding in carriage support 40 and actuated by jack 42. Thus, after arm 5 has been thrown down, the same is erected again by displacing rack 41 with the aid of jack 42. Both the cover opening and closing mechanisms are automatically operated and controlled by a central gun steering and process control unit which also monitors the grain feeding and steam supplying valves, including gun heating power and temperature control, and optionally grain preheating when available.

To shorten the total process time per puffing shot even further than that of the already obtained considerable decrease in comparison with prior art guns, a separate grain preheater is provided and linked to the grain feed lines of one or more puffing guns. The preheating unit comprises a hot gas duct including a pair of parallel-spaced gas permeable walls, wire screens or perforated sheets, between which a charge of grain material is retained in the form of a narrow stack traversed by a heating gas, e.g., fan circulated hot air heated by steam coils. Upper, respectively lower side walls of the stack are closable and connected to a grain supply source, respectively, a grain feeding line of a puffing gun. To enhance grain heating efficiency and to avoid clumping, the stacked grain mass is kept in movement during heating, preferably by driven helicoidal elements which are vertically disposed next to one another inside a frame holding the stack retaining, gas traversed side walls. See FIG. 8(a) and FIG. 8 (b).

FIG. 7 provides a schematic view of a production line comprising four puffing guns a,b,c and d arranged around one firing tunnel. The guns are suitably mounted on movable carriage frames, e.g., on a rail track to accommodate the shot repercussion. The open ended tunnel may have a resilient connection with the gun firing mouths and be partially foraminous in nature for smoother release of expansion pressures without grain spoilage. A belt conveyor integral with the tunnel underside discharges the expanded grains.

In a puffing operation of wheat cereals, the premilled grains having a suitable humidity and may be preheated at 100° to 200° C. preferably at 120°–150° C. and processed in the puffing gun at a steam pressure of 10–20 bar up to a temperature of about 250°–350° C., preferably about 270°–320° C. In these conditions a good quality product (less than 5% waste) was obtainable at high production rates, generally at least 40% higher than with conventional guns of comparable size and in less time per batch. Indeed, with a total process time decreased to about three minutes per gun charge, the hourly output of a comparatively small puffing gun should be raised to 100 kg.

Of course, other cereal materials and specific quality requirements, i.e. swelling degree, gelatinization level, etc. will necessitate modified process conditions which are readily adaptable to the puffing apparatus of this invention given the greater flexibility and adjustment possibility of the novel gun.

Figure 9:
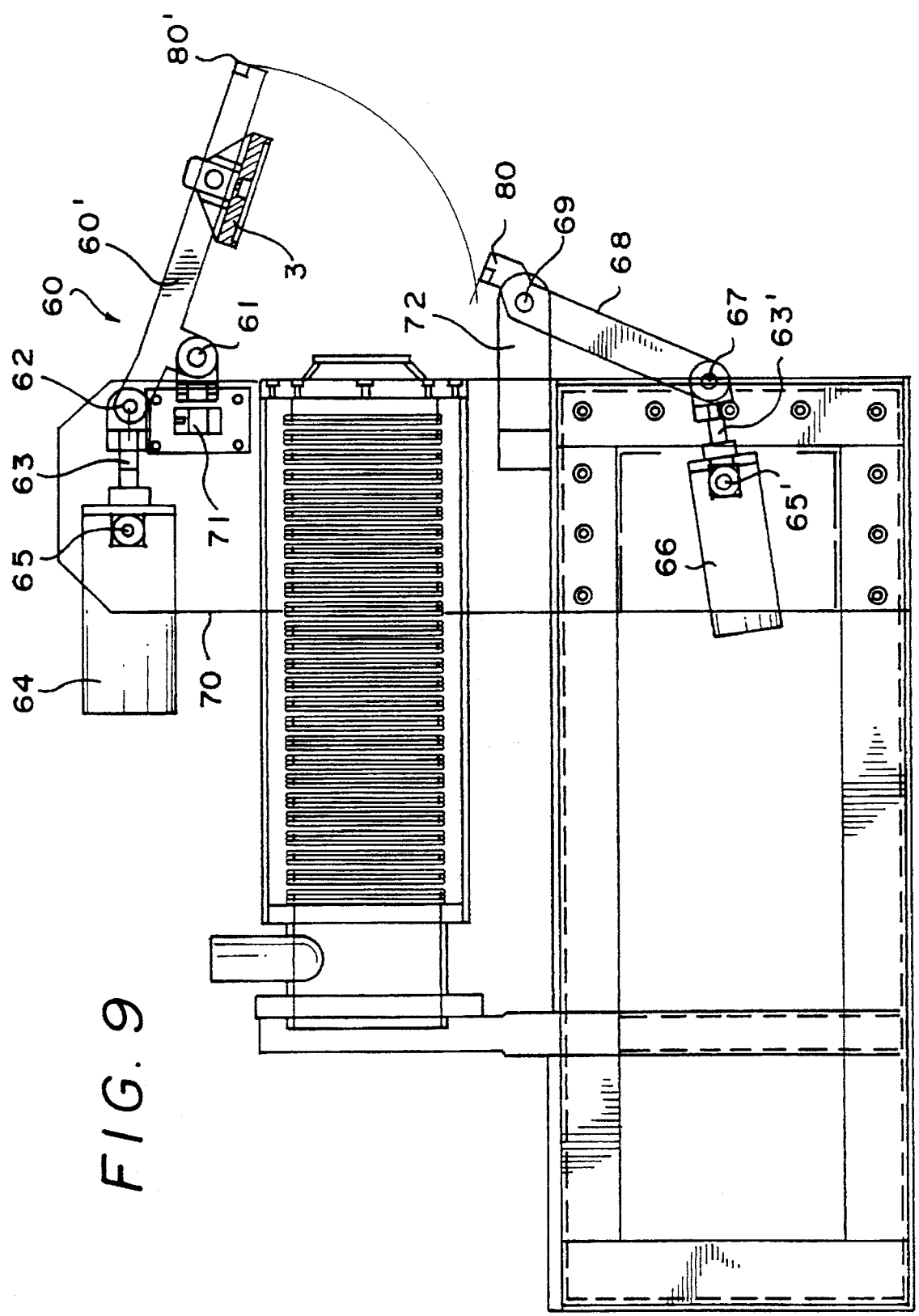
FIG. 9 is a side view of a puffing gun embodiment mounted on a support frame and provided with a preferred variant of a closing lid mechanism.

Referring now to FIG. 9 there is shown a particularly advantageous arrangement for closing, locking and opening the front cover, i.e. The door member sealing the puffing drum chamber during cooking and pressurization.

Bearing in mind that a closing door of a puffing gun is a heavy piece of equipment which, depending on the gun size, has to withstand a considerably pressurizing force of several tons, up to 20 tons or more in some cases, the closing/locking arrangement must fulfil severe criteria of safety and reliability. Furthermore, it should be automatically operable in preferably smooth conditions for safeguarding machine integrity after numerous puffing shots. These multiple requirements are most advantageously satisfied by a closing door system as depicted in FIG. 9. Here the closing door 3 is mounted on a rotatable arm 60 having an integral side arm 60' with a fixed rotation axis 61 and a movable hinged connection 62 linked to drive shaft 63 of jack means 64, actuated by fluid pressure, preferably a double-way air cylinder. Rotation axis 61 is supported by a fixed member 71 of frame plate 70. The hinged arm mechanism (60,61',61,62) forms a kind of a toggle allowing to move the door 3 along an appropriate circular path and to exert sufficient pressure to the door by means of jack 64. As can be seen, the door swings upward upon unlocking the lower part 80' of upper arm 60. The locking mechanism comprises a lower arm 68 rotating around fixed axis 69 of support member 72. The upper part 80 of arm 68 clamps the lower part 80' of upper arm 60 when the door is in the selaing position. The lower part of arm 68 forms a movable hinge connection 67 with a drive shaft 63' of jack means 66, preferably a double-way cylinder.

The upper closing jack 64 and lower locking jack 66 are rotatably mounted onto frame plate 70, e.g. by means of pivotable clamps 65, 65' such that the jacks are held between two parallel plates 70.

In this way the jacks will pivot in accordance with the angled position of shafts (63,63') imposed by the rotational positions of toggle arms (60,68).

A typical closing operation involves actuation of jack 64 such that shaft 63 moves to the right, thereby pushing hinged part 62 of arm 60 to the right and forcedly swinging arm 60 downwards by rotation of arm branch 60' around axis 61. By increasing jack pressure a sufficiently high sealing force can be transmitted to closing door 3. By means of locking jack 66 clamp arm 68 is brought in tight pressing contact against door arm 60, whereby parts 80 and 80' contact each other with their matching edges.

A typical puffing cycle at high steam pressure (of up to 15 bars or even more) lasts a few minutes. To allow an explosive expansion to ambient pressure the sealing door is opened by first releasing closing jack pressure and then locking jack pressure. The puffing shot gives a vigorous thrust to the heavy closing door 3 with arm 60; but thanks to the beneficial mechanical/driving arrangement of the door with "upward" rotation of arm 60 combined with fluid (air) pressure driven toggle connection, the shock is easily mastered and braked/damped by residual counter-pressure against which a closing jack piston moves backwards. The locking mechanism is similarly braked but poses less problems due to a lower mass and kinetical energy.

Besides the numerous operational and other technical advantages of the novel puffing gun, it is underlined that the ingenious concept of stationary barrel with rotational inner drum offers a lot of new possibilities in puffing processes. In particular the direct feeding pressurizes steam through the gun mantle via inlets at regular distances allows quicker and more uniform steaming. This may be combined with hot air and other gas inlets, via the pre-chamber and/or directly through the puffing chamber. In this way better control of temperature and humidity of grains and puffing atmosphere is achieved and moreover regular corn and untreated pop corns are amenable to direct expansion with the puffing gun of the present invention.

I claim:

1. A puffing gun for preparing expanded cereal grains comprising:
   a) a stationary gun barrel of tubular shape having a closed end face and an end face opposite thereto provided with an openable sealing cover, said barrel being substantially horizontally mounted on a supporting frame;
   b) a rotatable drum concentrically disposed interior of said stationary barrel;
   c) driving means for rotating said drum, said driving means operably connected to said drum and including a drive shaft passing through said closed end face of said stationary barrel;
   d) heating means for heating said stationary barrel, said heating means disposed around said barrel;

e) grain feeding means for supplying a desired quantity of cereal grain to be expanded into said rotatable drum;

f) means for supplying pressurized hot gases interior of said barrel and said stationary drum; and g) means for operational control of said puffing gun wherein a cereal grain supplied to said drum is subjected to controlled heating and pressure to cause expansion of the grain.

2. A puffing gun as in claim 1 and further comprising:

a) a grain inlet chamber positioned adjacent said closed end face of said stationary barrel and said inner drum driving means connection, said barrel is fixedly connected and in fluid communication with a grain inlet line positioned above said chamber, said inlet line including means for conveying a cereal grain to be expanded into a puffing chamber formed between the interior walls of said inner drum and said sealing cover; and b) a high pressure steam inlet in fluid communication with said gun barrel to selectively provide high pressure steam thereto.

3. A puffing gun as in claim 2 and wherein:

a) said means for conveying a cereal grain including an Archimedes-type screw conveyor element operably connected to at least a portion of said driving means drive shaft disposed interior of said grain inlet chamber.

4. A puffing gun as in claim 2 and wherein:

a) said driving means drive shaft disposed interior of said grain inlet chamber is formed as a screw conveyor along its entire length therein having a radial width corresponding to the interior diameter of said rotatable drum and an end face fixedly connected to a first end of said rotatable drum to thereby provide seamless transport of a cereal grain from said inlet chamber to said puffing chamber.

5. A puffing gun as in claim 1 and further including:

a) means for selectively sealing said barrel, said sealing means including a hinged, L-shaped support arm having a first end and a second end opposite thereto, said support arm first end is fixed to said sealing cover, said cover is selectively positionable by said arm into sealing engagement with said barrel, a damping device and ratchet assembly, said assembly is operatively connected to said support arm second end for damping of said support arm following the opening of said cover during a puffing operation and return of said cover into sealing engagement with said barrel thereafter.

6. A puffing gun as in claim 1 and wherein:

a) said heating means is an electrical resistor device adapted to encapsulate the exterior surface of said barrel.

7. A puffing gun as set forth in claim 1 and further comprising:

a) perforations extending through said barrel walls, said perforations sized to limit passage of the cereal grains therethrough, and b) at least one inlet line for providing pressurized hot gas to said barrel.

8. A puffing gun as set forth in claim 1 and further comprising:

a) means for selectively sealing said barrel, said sealing means including a first pivoting member having a first end and a second end opposite thereto, said first end of said first pivoting member is fixed to said sealing cover, said second end of said first pivoting member is operatively associated with a first jack device for selectively urging said cover into sealing engagement with said barrel, and b) means for locking said sealing means when engaged, said locking means including a second pivoting member having a first end and a second end opposite thereto, said first end of said second pivoting member is operatively associated with said second jack device for selectively locking said second end of said second pivoting member against said sealing cover.

9. A puffing gun as set forth in claim 8 and wherein:

a) said first and second jack devices include means for fluid pressure actuation including respective double-action air cylinders adapted to actuate respective drive shafts operatively associated with each of said first jack device and said first pivoting member and said second jack device and said second pivoting member by respective toggle-type linkage devices positioned therebetween, wherein said first jack device and said first pivoting member are positioned beneath said stationary gun barrel and said second jack device and said second pivoting member are positioned above said stationary gun barrel.

\* \* \* \* \*